A. J. & L. L. BEAUDETTE.
KETTLE-COVERS.

No. 194,571. Patented Aug. 28, 1877.

WITNESSES:
Gustav Dietrich
J. H. Scarborough

INVENTORS
A. J. Beaudette.
L. L. Beaudette.
BY
Munn & Co.
ATTORNEYS.

UNITED STATES PATENT OFFICE.

AGIDE J. BEAUDETTE AND LOUISE L. BEAUDETTE, OF FOND DU LAC, WIS.

IMPROVEMENT IN KETTLE-COVERS.

Specification forming part of Letters Patent No. 194,571, dated August 28, 1877; application filed July 23, 1877.

*To all whom it may concern:*

Figure 1:
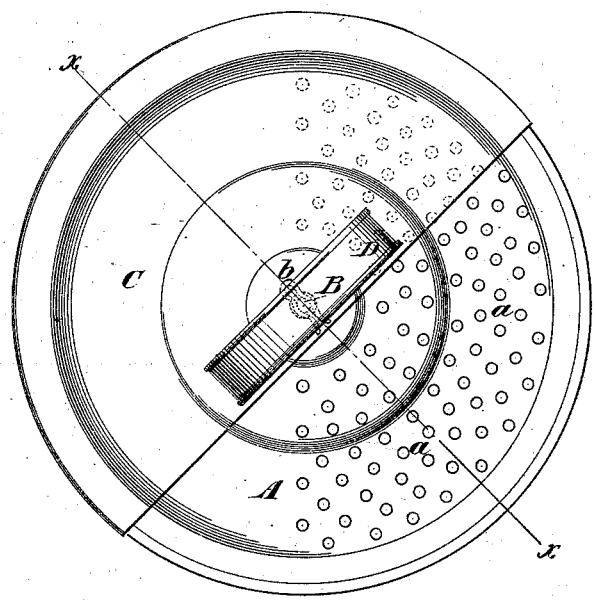
Figure 2:
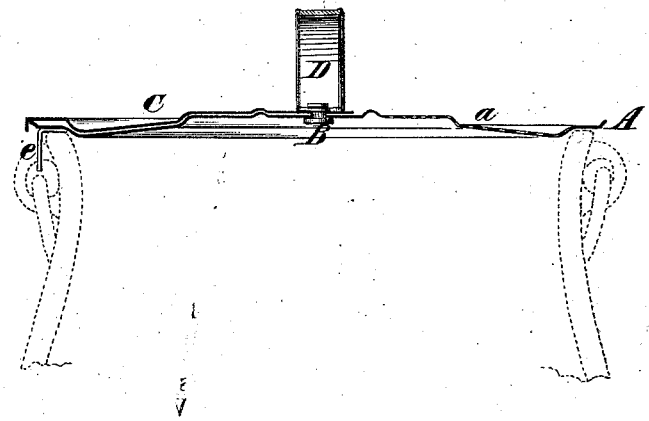

Be it known that we, AGIDE J. BEAUDETTE and LOUISE L. BEAUDETTE, of Fond du Lac, Fond du Lac county, Wisconsin, have invented a new and Improved Kettle Cover, of which the following is a specification:

Figure 1 is a top view, and Fig. 2 is a section on line $x\ x$, Fig. 1.

Similar letters of reference indicate corresponding parts.

Our invention consists of a kettle-cover, one-half of which is perforated with holes of suitable size, and which is provided with a cover that is capable of turning on a central pin, so as to cover the perforations, or leave them exposed, the object being to provide a cover that will permit of turning water off from articles in the kettle without danger of losing the articles or burning the hands.

A is a cover, one-half of which is perforated. B is a central pin or stud, on which the half-cover C is placed, and retained by a spring-key, $b$, which slips over the pin and fits in a groove cut in it. D is a handle attached to the half-cover C, by which it is turned, and by which the whole cover is handled.

The half-cover is capable of covering part or all of the perforations in the cover.

A lip, $e$, is attached to one side of the cover, which engages with the ear of the kettle, and keeps the cover from turning.

The cover may be readily taken apart for cleaning by removing the spring-key $b$.

The advantages claimed for this cover are, that it will retain articles in the kettle while the water can be readily poured off. It also prevents the escape of the main volume of steam, thus preventing the burning of the hands.

It can be used to advantage when meats are cooked, as it permits the escape of steam, but prevents the spattering of grease.

Having thus described our invention, we claim as new and desire to secure by Letters Patent—

The combination of the perforated cover A, the half-cover C, pin B, spring-key $b$, handle D, and lip $e$, substantially as specified.

AGIDE J. BEAUDETTE.
LOUISE L. BEAUDETTE.

Witnesses:
C. V. MIHILLS,
CHAS. F. SITTIG.